June 26, 1962 G. R. JOHNSON ET AL 3,040,914
METHOD AND MEANS FOR HANDLING FREIGHT
Filed May 12, 1959 4 Sheets-Sheet 1
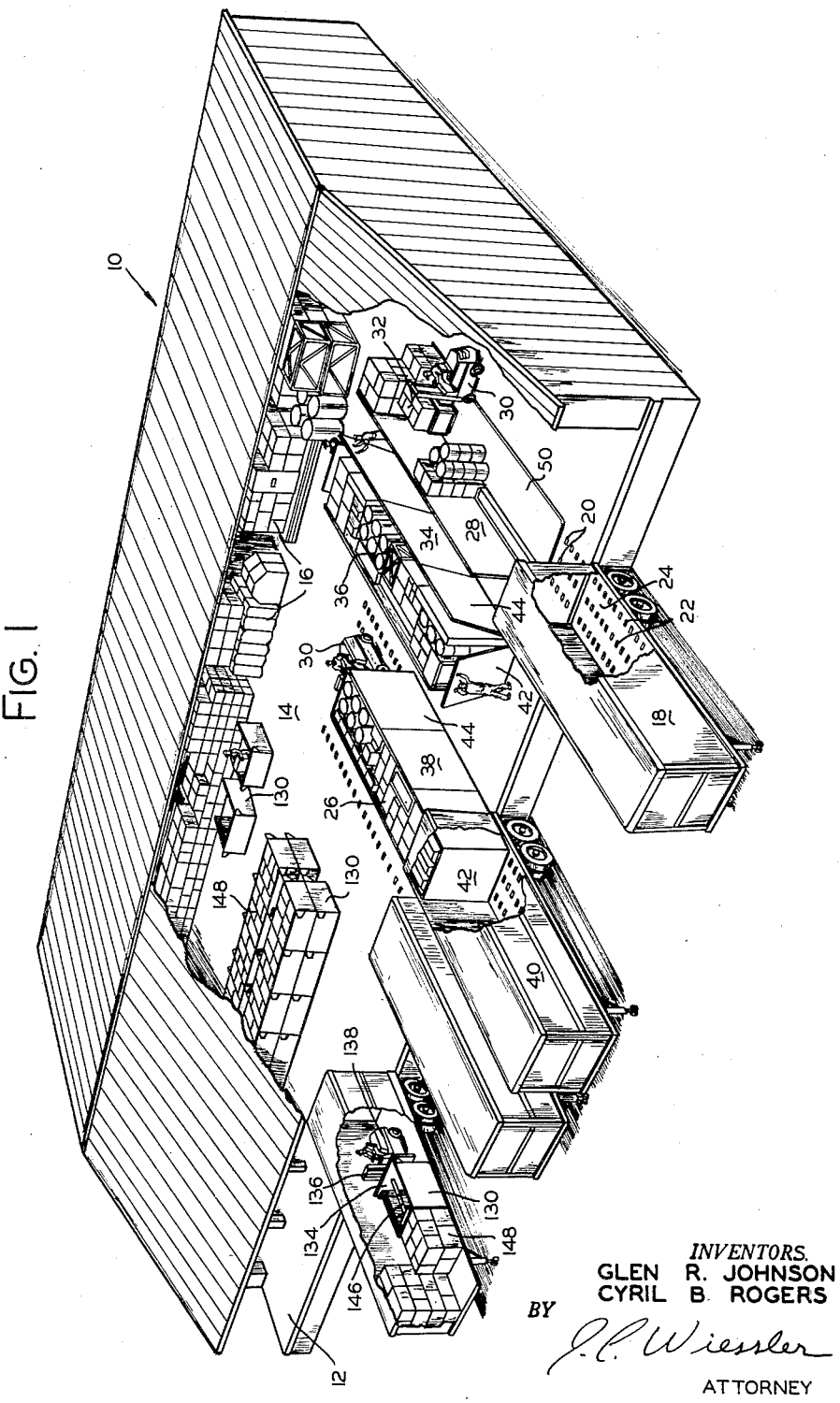
INVENTORS.
GLEN R. JOHNSON
CYRIL B. ROGERS
BY
*J. C. Wiessler*
ATTORNEY

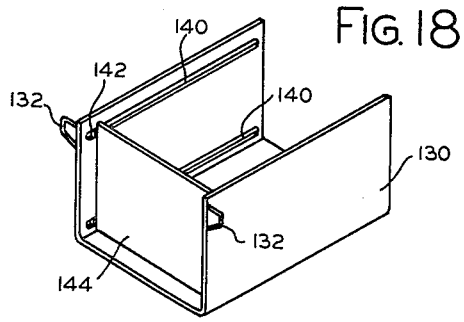
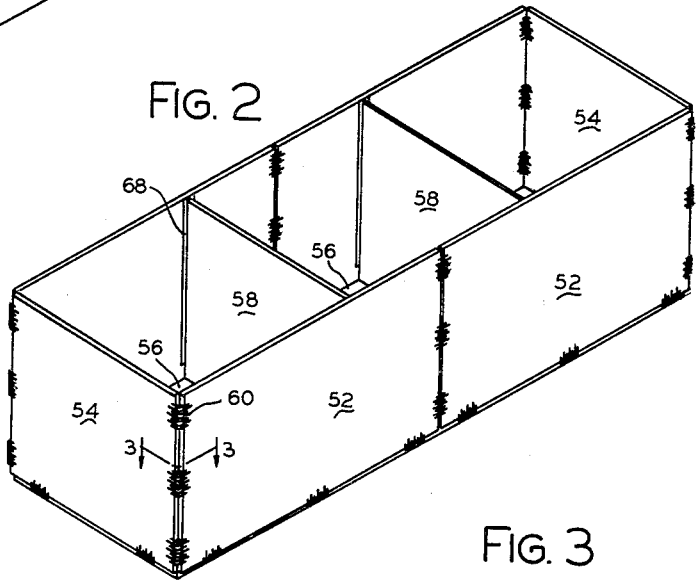
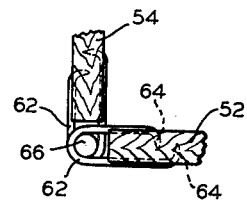
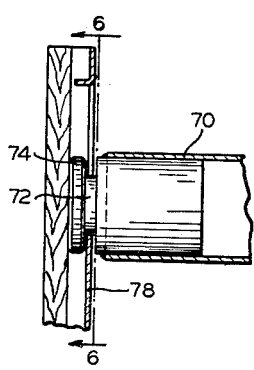
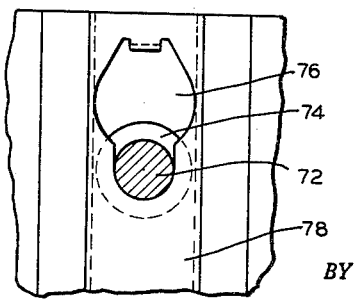

June 26, 1962   G. R. JOHNSON ET AL   3,040,914
METHOD AND MEANS FOR HANDLING FREIGHT
Filed May 12, 1959   4 Sheets-Sheet 3
FIG. 4
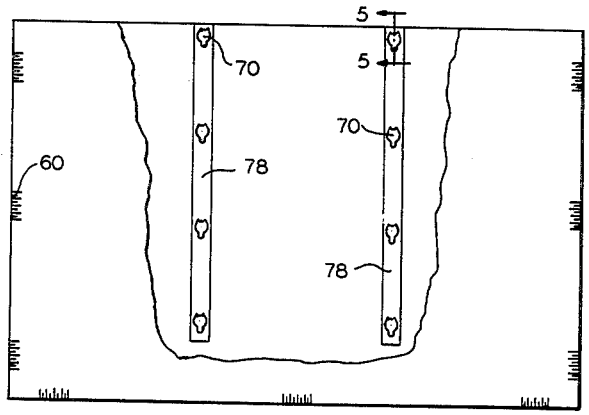
FIG. 13
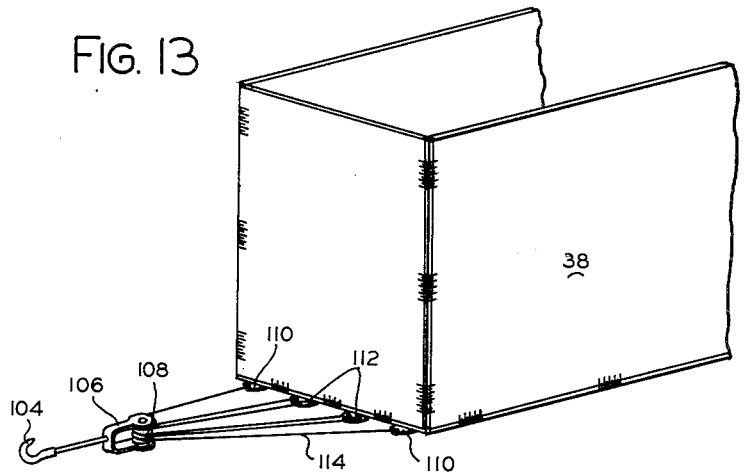
FIG. 14
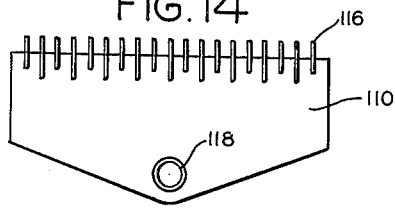
FIG. 17
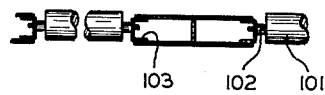
FIG. 15   FIG. 16
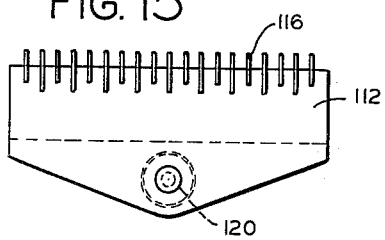 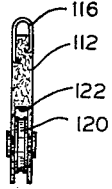
INVENTORS.
GLEN R. JOHNSON
CYRIL B. ROGERS
BY J. C. Wiessler
ATTORNEY June 26, 1962   G. R. JOHNSON ET AL   3,040,914
METHOD AND MEANS FOR HANDLING FREIGHT
Filed May 12, 1959   4 Sheets-Sheet 4
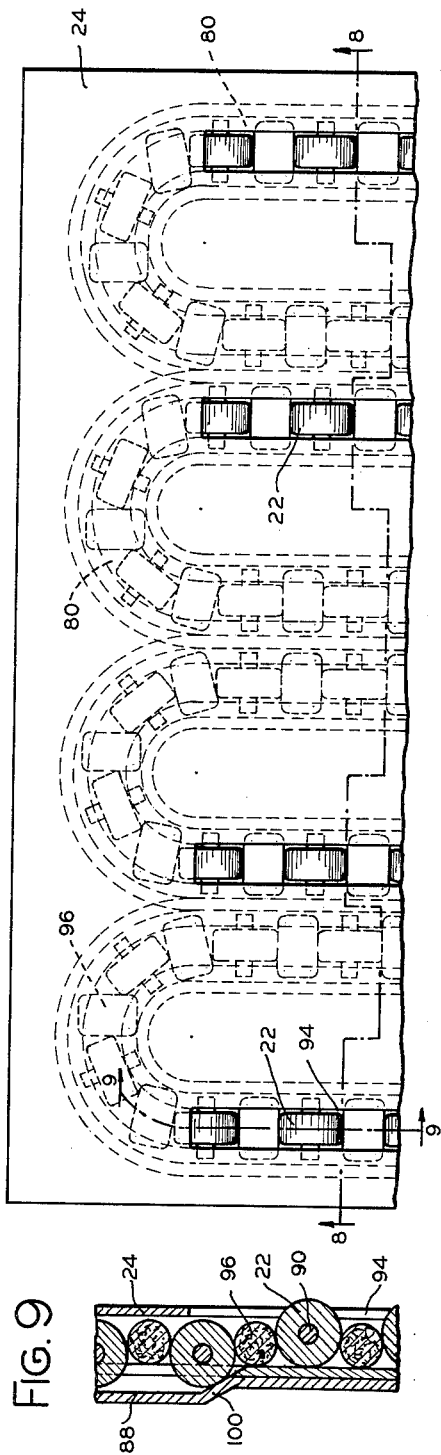
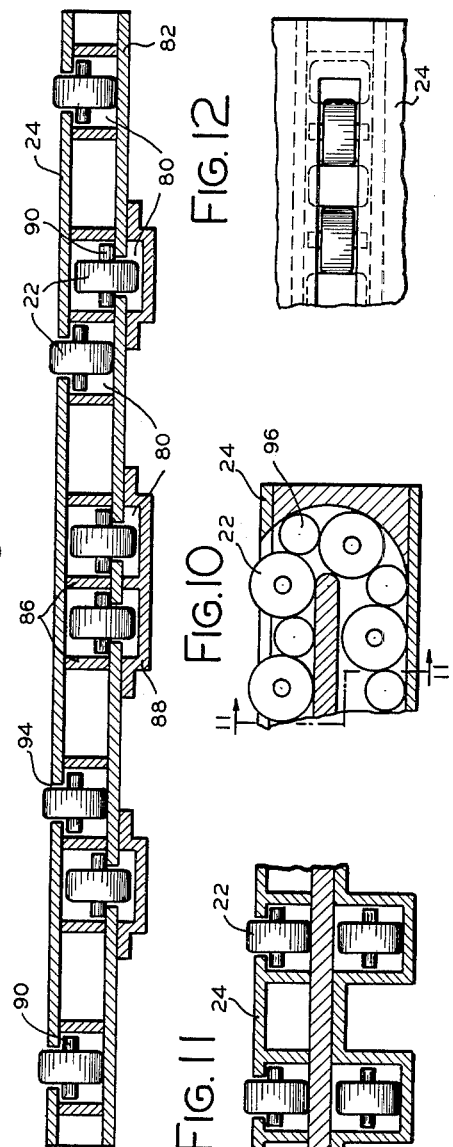
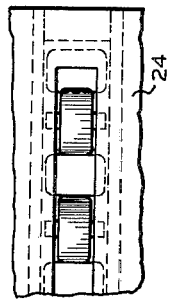
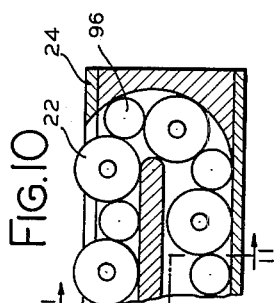
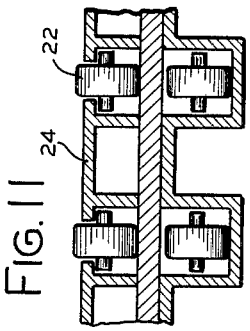
INVENTORS.
GLEN R. JOHNSON
CYRIL B. ROGERS
BY
ATTORNEY

United States Patent Office 3,040,914
Patented June 26, 1962

3,040,914
METHOD AND MEANS FOR HANDLING FREIGHT
Glen R. Johnson and Cyril B. Rogers, Battle Creek, Mich., assignors to Clark Equipment Company, a corporation of Michigan
Filed May 12, 1959, Ser. No. 812,698
8 Claims. (Cl. 214—38)

This invention relates to a method and means for handling freight and more particularly to a method and means for pre-assembling, loading, and unloading freight. It is particularly suited for use in the trucking industry, but it is not intended that its use be restricted to the handling of freight by truck.

One of the major problems with which truck transportation firms are currently concerned is whether to develop new materials handling systems capable of substantially expanding the volume of freight which can be efficiently handled at present freight terminal facilities, or to enlarge existing facilities or construct new ones. The latter alternative is one which the industry generally prefers to avoid in view of the great cost which is involved in new construction. As shipper's demands on the freight transportation industry, and particularly the trucking industry, continue to increase, the urgency of finding the right solution to the problem becomes greater.

Some of the most important objectives of the industry we conceive to be as follows: to avoid new construction; to develop more efficient methods of handling freight and to increase the speed of loading and unloading of freight at existing facilities; to be capable of handling an increased volume of freight without substantially increasing the labor force required.

The present invention offers a unique solution to the problem posed above in that its use facilitates the rapid handling of a substantially greater volume of freight at existing terminal facilities with the same or a decreased labor force and without requiring construction of new building facilities, while, at the same time, minimizing the "turn-around" time of truck-trailer units waiting to be loaded preparatory to making a return trip. Accordingly, each of the aforesaid industry objectives is also an object of this invention. As the description proceeds it will also be recognized that these objectives may be attained by only a relatively modest investment in materials handling equipment.

It is a further object of the invention to improve upon present freight handling methods and means by providing a new method and means for pre-assembling, loading, and unloading freight.

In carrying out our invention we provide an arrangement wherein trailer size loads are pre-assembled upon a sheet of material having removable sides and ends which, upon association of the sides and ends therewith to form a box-like container, may be telescoped into an empty trailer unit and, upon arrival at destination, may be removed as a unit from the trailer unit and another pre-assembled load inserted into the trailer for the return trip with minimum loss of time. Thus, utilization of the expensive rolling stock of the trucking industry can be maximized by keeping the stock moving with a payload on an almost continuous basis.

The above and further objects, features, and advantages of the present invention will appear to those familiar with the art from the following detailed description and with reference to the accompanying drawings.

In the drawings:

FIGURE 1 is a view in perspective which illustrates generally the method and means of the present invention;

FIGURE 2 is a view in perspective illustrating one form of load container as may be used in the present invention;

FIGURE 3 is a view in section taken on line 3—3 of FIGURE 2;

FIGURE 4 shows in side elevation a somewhat modified form of a portion of the container illustrated in FIGURE 2 with a broken away section;

FIGURE 5 is a view in section taken on line 5—5 of FIGURE 4;

FIGURE 6 is a view in section taken along line 6—6 of FIGURE 5;

FIGURE 7 is an enlarged broken away plan view of roller means illustrated in FIGURE 1 and associated with the bed of the trailer unit;

FIGURE 8 is a view in section taken along line 8—8 of FIGURE 7;

FIGURE 9 is a view in section taken along line 9—9 of FIGURE 7;

FIGURE 10 is a partial view in side section illustrating a modified form of the roller construction shown in FIGURE 7;

FIGURE 11 is a broken away sectional end view taken along line 11—11 of FIGURE 10;

FIGURE 12 is a broken away plan view of FIGURE 10;

FIGURE 13 is a broken away schematic view of a container which may be of the type shown in either FIGURES 2 or 4 and which particularly illustrates means for removing a container from a trailer unit;

FIGURE 14 is a detailed plan view of end bracket means illustrated in FIGURE 13;

FIGURE 15 is a detailed plan view of intermediate bracket means illustrated in FIGURE 13;

FIGURE 16 is a side view in elevation of FIGURE 15;

FIGURE 17 is a broken away sectional view illustrating one form of roller means which may be used in a loading dock area; and FIGURE 18 is an enlarged view in perspective of an open ended load handling means associatable with a material handling machine as illustrated in a portion of FIGURE 1.

Referring now to the drawings, a freight terminal is illustrated generally at numeral 10 having a loading dock area 12 and a storage area 14 containing representative packaged goods 16 of various sizes and configurations. A plurality of semi-trailer units, two of which are designated by the numerals 18 and 40, are located in loading relation to dock 12; i.e., in alignment with rows of rollers 20 which, as illustrated, are mounted in the floor of the loading dock area of terminal 10. Rows of roller means 22 are located in bed 24 of each trailer unit and cooperate with rollers 20 in a manner to be described to aid in the loading and unloading of complete pre-containerized loads, as illustrated at numeral 26, into and from the trailer unit.

Illustrated at numeral 28 is a portion of a partially loaded container which will be described in detail below. A material handling machine, illustrated as a fork lift truck 30, is located adjacent the one open side of container 28 and is about to deposit a discrete load unit 32 of a complete load to be contained by container 28, as illustrated at numeral 26. Each load unit 32 will be selected by the operator of the lift truck 30 from the main storage area which contains load units prescheduled for transport to a predetermined destination in the selected trailer unit 18.

A fully loaded container unit 34 is shown being assembled by workmen to containerize a load 36 for subsequent transport by a trailer unit which has not yet arrived in the open dock area adjacent container 34.

The load 26 is fully containerized by unit 38 and, as illustrated, is being pushed over roller sets 20 and 22 into trailer unit 40 by means of a second material handling machine 30. Machine 30 may also be utilized as a towing tractor having a suitable coupling with container 38, in which event the various apparatus shown in association with load 26 illustrates the technique of removing the containerized load from the trailer, as well as the technique of moving the load into the trailer. An embodiment of one form of towing hook means which is attachable at one end of the container is illustrated in FIGURES 13 through 16, and will be described in detail later.

It will be perceived that the containers 28, 34 and 38 include removable and collapsible end and side panels 42 and 44, which panels are being raised into an operative position relative to load 36 so as to contain the load in the same manner as load 26 is contained by container 38. When in raised position means to be described hold the ends and sides 42 and 44 in operative transverse relation to each other. Preferably, these container panels are constructed so as to be readily detachable from floor members 50 so that loading and unloading thereof may be facilitated. When not in use, each container is preferably dismantled into a plurality of flat sheets comprising the sides, ends and floor panels which may be suitably stored in a section of the building for future use as required. Detailed exemplary embodiments of such container units are illustrated in FIGURES 2 through 6. However, it is to emphasized that such embodiments are illustrative only of container constructions which may be used in carrying out our invention.

Before proceeding with the details of construction as illustrated in the figures following FIGURE 1, it will be appreciated by persons skilled in the art that our invention effectively implements the above stated objectives of the industry by providing a freight handling method which requires only relatively slight modification of present facilities in the addition of roller or other anti-friction means to dock and trailer units, and in the use of novel collapsible and storable container means for facilitating the pre-loading, transportation, unloading and storage of freight. Material handling machines, such as fork lift trucks, are contemplated for use in the system as an integral part of the handling method. For example, it will be recognized that our freight handling method minimizes the time during which each trailer unit is held at the terminal building for unloading and loading thereof. Of course, in order to utilize the maximum potential of the method, dispatchers are required to carefully schedule the freight handling operation at the terminal building with expected times of arrival and departure of trailer units and with the necessary pre-information concerning the inventory of loads to be dispatched in outgoing trailer units for each day's operation. When the method is properly used it enables trailer units to be immediately unloaded upon arrival at the loading dock and then almost immediately reloaded with a pre-containerized load such as 26. Correlatively, the freight handling capacity of a given facility is substantially expanded, thereby tending to avoid costly new construction.

In FIGURE 2 we have illustrated a form of container which can be readily assembled, disassembled and moved from place to place by two persons and a fork lift truck, for example. As illustrated, it comprises pairs of parallel side members 52, a pair of opposite end members 54, a pair of floor members 56 and a pair of partitions 58. Each container unit may be expanded to any desired length depending upon the length of a particular trailer unit by adding floor and side members. When assembled, each side and end panel is held in operative relation to the adjacent panel and to the floor member by means of a plurality of lacing means 60, detailed in FIGURE 3. It has been found that such lacing means affords a relatively simple, effective and low-cost means for assembling and disassembling the container panels.

Each lacing section 60 comprises a plurality of loops 62 which extend beyond the edge portion of the respective panel and which terminate in spaced hook portions 64 which are imbedded in the opposite side surfaces of the respective panel member. Conveniently, the panel members may be constructed of plywood material. The loop members 62 of panel 54, for example, are spaced along the edge portion of member 54 so as to be registrable within the spaces between the loop members of panel 52, whereby to form an opening for receiving a pin 66 so as to form a hinge between the connected panel members.

Each panel member is preferably of such dimension that it may readily be handled by two persons during assembly and disassembly of the container. When completely disassembled, each container comprises a compact unit of side-by-side panel members which may be stored conveniently in the terminal building. A fork truck, for example, may be utilized to transport the unit of panels comprising each container from storage to the loading dock area for assembly. Partitions 58 are adapted to engage slots 68 formed in the side panel members so as to divide portions of the complete load, if desired, as well as to strengthen the assembled container against inward buckling.

Another form of container partition and strengthening structure is illustrated in FIGURES 4, 5 and 6. As shown, a plurality of rod members 70 having a reduced neck portion 72 and a flanged end 74 are registrable with eyes 76 which are formed in vertical strips 78 spaced lengthwise along the respective panel members. Bar members 70 thus provide structure resisting inward or outward buckling of the panels, as well as serving as partitions dividing the containerized load into sections.

Referring to FIGURES 7, 8 and 9, rollers 22 are illustrated in detail in association with trailer bed 24. The arrangement of roller means illustrated comprises a plurality of substantially oval tracks 80 containing the rollers 22 which are adapted to circulate upon the insertion or removal of a container about the oval track from a level projected slightly above trailer floor 24 to a level below said floor. The lower track section of each group of circulating rollers is formed between floor member 24 and a member 82 which is spaced therebeneath. In order to minimize the collection of foreign materials, such as dirt, within the lower track portions the same are enclosed by means of wall members 86 and channels 88. The rollers 22 are of a low-cost construction in that no bearing and spindle means are required. Instead, each roller includes a pin 90 which functions merely as a retainer for the roller within the upper and lower track portions. A plurality of slots 94 are provided in trailer floor 24 through which project the upper portion of each set of rollers during traverse thereof in the upper track section. Intermediate each pair of adjacent rollers 22 is located a smaller roller member 96, preferably of a fibrous or nylon material, which collectively function as pusher means causing the rollers 22 to roll about the oval track. Each channel member 88 includes a cam portion 100 which functions to raise or lower rollers 22, as the case may be, as said rollers circulate from one track elevation to the other.

Referring to FIGURES 10, 11 and 12, there is disclosed a modified form of roller construction wherein the upper and lower roller tracks together form an essentially oval construction located in a vertical plane, thus being adapted to provide a greater number of load bearing surfaces in a trailer bed of given width, as illustrated, while retaining the relatively low cost feature of circulating and pusher rollers 22 and 96.

If desired, the rollers may, of course, be of a non-circulating type suitably spaced one from the other in the trailer bed and permanently mounted upon a rotatable shaft member associated with fixed bearing supports in the trailer bed. Alternatively, rotatable balls may be journaled in suitably spaced relation in pockets formed in the trailer bed for performing the function of rollers 22. However, it will be appreciated that either of the latter two mentioned exemplary alternative constructions tend to be substantially more costly than those described in detail above.

FIGURE 17 illustrates a fixed type of roller 101 supported by a spindle 102 which is mounted for rotation in floor members 103. This type of roller installation may be found to be more suitable for use on dock 12 than other types described above because of greater ease in installing same in existing facilities.

It will be understood that a roller construction may be provided in the floor portion 50 of each container unit, thereby eliminating the necessity of installing roller units 20 and 22 in the dock and trailer bed constructions. In fact cost considerations tend to favor such a construction. However, it will be appreciated that such a construction would probably not be satisfactory if used on any but a smooth floor or dock surface, and for the latter reason we prefer the use of rollers in the trailer bed and on the dock surface.

Referring to FIGURES 13-16, there is illustrated a towing hitch construction which may be readily assembled and disassembled from a container unit. A coupling hook 104 which may be engaged, for example, by a coupling eye associated with a machine 30 for exerting pulling action on container 38 whereby to remove same from a trailer unit, is connected by a bracket member 106 and a double sheave 108 to a plurality of horizontally spaced brackets 110 and 112 by means of a cable 114. Each of the brackets provides a lacing construction 116 which is associatable with corresponding lacing provided in the end edges of the floor member of the container, the same as is shown in FIGURE 3. Bracket 110 provides an opening 118 which may be utilized to anchor one end of cable 114. Each of brackets 112 provides a single sheave 120 located in a slot 122. This arrangement of brackets in association with sheave 108 provides an essentially equal tension on each strand of cable 114 during towing, with the cable passing from one corner bracket 110 over sheave 108, around sheave 120 of remote bracket 112, thence back around sheave 108 and pulley 120 of adjacent bracket 112, and finally back around sheave 108 to the opposite anchor end at corner bracket 110.

With the details of construction now described, the accomplishment of the objectives of our freight handling system, as discussed hereinabove, will be more readily apparent to persons skilled in the art. It will be understood that the constructional details as described are exemplary only of numerous available constructional means for carrying out our method of handling freight.

Referring now again to FIGURE 1, and to FIGURE 18, it will be observed that a somewhat different freight handling apparatus is illustrated in the left end portion of terminal building 10. The latter system provides what we denote as cubage boxes 130 for pre-assembling modular load units. Each cubage box 130 comprises a three-sided box, the size of which is preferably a module or integer of the trailer volume. Extending outwardly of the upper corners of one end of each box 130 are a pair of ears 132 which are adapted to be engaged by hook members, not shown, mounted upon a carriage 134 elevatable in a well known manner upon upright mast 136 of fork truck 138. Extending lengthwise in vertically spaced relation of the inner surfaces of the side members of box 130 are a pair of slots 140 supporting rollers 142 of a plate member 144. A hydraulically operated telescopic ram member is generally illustrated at numeral 146, it being associated with fork truck 138 and carriage 134 in known manner. When a cubage box containing a load 148 is supported upon carriage 134 ram 146 is available to actuate plate member 144 longitudinally of the box, thus discharging load unit 148 from the opposite end thereof. By utilizing a cubage box volume which is an integer of the trailer volume it will be apparent that maximum utilization of available trailer volume is assured without dependence upon the judgment of a freight loader. Also, load selected for shipment may be pre-assembled in a plurality of such boxes, as illustrated in the left end area of building 10, whereby upon the arrival of a trailer unit the modular loads 148 may be rapidly transferred to the trailer thereby minimizing time spent at the loading dock. If desired, cubage boxes 130 may be transported with the load to facilitate a rapid unloading operation at destination. Of course, in the latter instance the outer envelope of the cubage box should be an integer of the trailer volume rather than the inner space envelope thereof.

In summary, our preferred method of expediting the handling of freight between terminals utilizes the collapsible portable container units 28, 34 and 38, each of which is adapted to contain a pre-assembled trailer size load which is insertable and removable from the trailer as a unit, and wherein the sides and ends of the container may be pivoted into flush position with the floor member thereof and are preferably removable from connection with the floor member for facilitating storage of the container panels and loading of the container floor.

Now, while we have shown and described what we believe to be certain preferred embodiments of our present invention, it should be clearly understood that numerous modifications, rearrangements of structure, and the like, may be made therein without departing from the spirit and scope of the present invention.

We claim:

1. A method for containerizing and handling freight at a loading dock area and transferring the containerized freight to a trailer unit comprising the steps of locating in the loading dock area the elements of at least a partially disassembled multi-sided collapsible container having a relatively rigid flat continuous floor portion, locating the floor portion in a selected position in the loading dock area, driving a vehicle to, from and on the floor portion to successively engage, lift and move selected load units from a stored location thereof to the floor portion of the container, pivotally securing to boundary portions of the floor portion container panel members which are locatable in substantially co-planar relation to the floor portion, pivoting all container panel members into substantially vertical positions to embrace the load units, securing together adjacent edge portions of each adjacent pair of panel members to form a trailer length box containing said load units, locating an unloaded trailer unit in endwise relation to the loading dock and in longitudinal alignment with the box, and driving a vehicle into abutment with one end of the box to push said one end remote from the trailer unit to telescope the box totally within the trailer unit whereby to substantially fill the longitudinal loading space thereof.

2. A method for containerizing and handling freight at a loading dock area and transferring the containerized freight to a trailer unit comprising the steps of locating in the loading dock area a relatively rigid flat continuous container floor portion, driving a vehicle to, onto and from the floor portion to transfer selected load units onto the floor portion, pivotally connecting to and peripherally of the floor portion side and end panels such that the panels are movable between the plane of the floor portion and substantially vertical positions, securing together the corner portions formed between the side and end panels when the same are located in vertical positions whereby to form a trailer sized container for said load units, backing an open end trailer unit into the loading dock and in longitudinal alignment with the container, driving a vehicle into abutment with the end of the container remote from the trailer, and motivating said vehicle to push the container from the loading dock area into telescoping relation to the trailer unit whereby to substantially fill the loading space thereof.

3. A method for handling freight as claimed in claim 2 comprising the additional steps of backing the trailer unit into transverse relation to a second loading dock area, securing a vehicle to the one end portion of the container nearest the loading dock, driving the vehicle longitudinally away from the trailer unit and pulling the container from the trailer unit onto the second dock area, disconnecting at least two corner portions of the container, pivoting at least one container side panel into the plane of the floor portion, and driving a vehicle to successively lift and remove the load units from the floor portion to a storage area.

4. A method of handling freight as claimed in claim 2 comprising the additional steps of backing the trailer unit into transverse relation to a second loading dock area, securing a vehicle to one end portion of the container nearest the second dock, driving the vehicle longitudinally away from the trailer unit and pulling the container from the trailer unit onto the second dock area, disconnecting the vehicle from the container, disconnecting at least some of the corner portions of the container, disconnecting at least one of the panels from the floor portion, and driving the vehicle to and from the floor portion to successively remove the load units therefrom.

5. A method for containerizing and handling freight at a loading dock area and transferring the containerized freight to a trailer unit comprising the steps of locating in the loading dock area the elements of at least a partially disassembled multi-sided collapsible container having a relatively rigid flat continuous floor portion, locating the floor portion in a selected position in the loading dock area, driving a vehicle to, from and on the floor portion to successively engage, lift and move selected load units from a stored location thereof to the floor portion of the container, pivotally securing to boundary portions of the floor portion side and end panels such that said panels are movable between the plane of the floor portion and substantially vertical positions, pivoting all container panel members into substantially vertical position to embrace the load units, securing together adjacent edge portions of each adjacent pair of panel members to form a trailer length box containing said load units, locating an unloaded trailer unit in end wise relation to the loading dock and in longitudinal alignment with the box, driving a vehicle into abutment with one end of the box, and motivating the vehicle to push the container from the loading dock area into telescoping relation to the trailer unit whereby to substantially fill the loading space thereof.

6. In a freight handling system the combination of a trailer size load container having a relatively rigid flat continuous floor portion upon which a plurality of discrete load units may be assembled, a plurality of end and side panel members pivotally connectible to the floor portion and to each other at adjacent edges to form a box-like container for said load units, said end and side panel members being pivotable from a horizontal position in which they are in co-planar relation to the floor portion to a vertical position in which adjacent edges thereof are secured together to form said box-like container, a trailer having anti-friction roller means located in and extending slightly above the load supporting surface thereof, a loading dock having anti-friction roller means located in and extending slightly above the load supporting surface thereof in parallel rolling relation to the trailer roller means when the trailer is located endwise of the loading dock, said container being adapted to contain a trailer size load which is telescopical within the trailer unit upon said trailer roller means, and vehicle means movable to, from and on the floor portion for assembling said load units on said floor portion, for pushing the box-like container into telescopical relation to the trailer unit over said roller means of the trailer and of the loading dock, and for pulling said box-like container from its telescopical relation to the trailer unit onto the roller means of the loading dock.

7. A freight handling system as claimed in claim 6 wherein said end and side panel members are disconnectible from the floor portion and from each other for storage in compact side-by-side relation when not in use.

8. A method for handling freight as claimed in claim 3 comprising the additional steps of disconnecting connected edge portions of all of the side and end panels from each other and of the side and end panels from the floor portion, and storing said side and end panels and floor portion in side-by-side or co-planar relation.

References Cited in the file of this patent

UNITED STATES PATENTS

| | | |
|---|---|---|
| 1,230,830 | Ickes | June 19, 1917 |
| 1,373,052 | Carrie | Mar. 29, 1921 |
| 1,611,882 | Budd | Dec. 28, 1926 |
| 2,049,620 | Reed et al. | Aug. 4, 1936 |
| 2,123,424 | Kellett | July 12, 1938 |
| 2,465,133 | Toffolon | Mar. 22, 1949 |
| 2,491,824 | McKee | Dec. 20, 1949 |
| 2,672,379 | McVey | Mar. 16, 1954 |
| 2,693,286 | Cocks | Nov. 2, 1954 |
| 2,707,573 | Balwics | May 3, 1955 |
| 2,711,835 | Kappen | June 28, 1955 |
| 2,744,758 | Stokvis et al. | May 8, 1956 |
| 2,802,583 | Dansereau | Aug. 13, 1957 |
| 2,820,560 | Davis | Jan. 21, 1958 |
| 2,956,663 | Reeves | Oct. 18, 1960 |